(12) United States Patent
Middlebrook (10) Patent No.: US 10,907,744 B1
(45) Date of Patent: Feb. 2, 2021

(54) PRESSURE RELIEF VALVE

(71) Applicant: Vortech Engineering, Inc., Oxnard, CA (US)

(72) Inventor: James Middlebrook, Santa Rosa Valley, CA (US)

(73) Assignee: Vortech Engineering, Inc., Oxnard, CA (US)

( * ) Notice: Subject to any disclaimer, the term of this patent is extended or adjusted under 35 U.S.C. 154(b) by 0 days.

(21) Appl. No.: 16/947,371

(22) Filed: Jul. 30, 2020

(51) Int. Cl.
| | |
|---|---|
| F16K 17/06 | (2006.01) |
| F16K 27/02 | (2006.01) |
| F16K 15/06 | (2006.01) |

(52) U.S. Cl.
CPC ............. *F16K 17/06* (2013.01); *F16K 27/02* (2013.01); *F16K 15/06* (2013.01); *F16K 17/065* (2013.01); *Y10T 137/7834* (2015.04)

(58) Field of Classification Search
CPC ........ F16K 17/06; F16K 27/02; F16K 17/065; F16K 15/06; Y10T 137/7897; Y10T 137/7918; Y10T 137/7919; Y10T 137/7923; Y10T 137/7932; Y10T 137/7935; Y10T 137/7876; Y10T 137/7834; Y10T 137/87105; Y10T 137/7787; Y10T 137/7751; Y10T 137/7749
See application file for complete search history.

(56) References Cited

U.S. PATENT DOCUMENTS

| | | | | |
|---|---|---|---|---|
| 1,743,350 | A * | 1/1930 | Hopkins | F16K 17/06 137/382 |
| 2,112,602 | A * | 3/1938 | Loebs | F02M 21/00 137/480 |
| 2,189,694 | A * | 2/1940 | Work | E03C 1/108 137/218 |
| 2,408,161 | A * | 9/1946 | Darnell | F02D 9/02 137/482 |
| 2,888,033 | A * | 5/1959 | Eickmeyer | B05B 1/3006 137/505 |
| 2,966,918 | A * | 1/1961 | Kosmalski | F16K 31/363 137/102 |
| 3,027,905 | A * | 4/1962 | Dobrikin | F16K 15/18 137/102 |
| 3,151,628 | A * | 10/1964 | Heckert | G05D 7/0106 137/500 |
| 3,276,470 | A * | 10/1966 | Griffing | G05D 16/0619 137/505.15 |
| 3,480,746 | A | 11/1969 | Fry | |
| 3,552,713 | A | 1/1971 | Kleeberg | |
| 3,643,583 | A | 2/1972 | Fritz | |
| 3,675,751 | A | 7/1972 | Fortner | |

(Continued)

*Primary Examiner* — Marina A Tietjen
*Assistant Examiner* — Frederick D Soski (57) ABSTRACT

The disclosure concerns a pressure relief valve. The pressure relief valve includes a base member having a support element extending therefrom. A moveable housing is slideably attached to the support element, with the support element designed to allow the moveable housing to travel toward and away from the base member. A housing guide is located within the moveable housing, with the housing guide adjustably attached to the support element, and slideably attached to the moveable housing. During operation, the moveable housing extends from and retracts toward the base member, thereby opening and closing the pressure relief valve.

16 Claims, 6 Drawing Sheets

(56) References Cited

U.S. PATENT DOCUMENTS

| | | | |
|---|---|---|---|
| 3,695,300 A | 10/1972 | Bradel | |
| 3,705,594 A | 12/1972 | Placek | |
| 4,367,764 A * | 1/1983 | Fitzgerald | F01N 3/22 128/911 |
| 4,474,207 A * | 10/1984 | Rosenberg | G05D 16/10 137/220 |
| 4,545,560 A | 10/1985 | Marcadet | |
| 4,678,004 A * | 7/1987 | Rosenberg | A01G 25/165 137/469 |
| 4,958,656 A | 9/1990 | Patel | |
| 5,682,624 A * | 11/1997 | Ciochetti | E04H 4/12 137/526 |
| 5,924,671 A | 7/1999 | Baumann | |
| 6,076,799 A | 6/2000 | Baumann | |
| 6,334,460 B1 | 1/2002 | Hem | |
| 6,578,601 B2 * | 6/2003 | Giordano | G05D 16/106 137/505.18 |
| 6,775,990 B2 | 8/2004 | Swinford | |
| 7,077,158 B2 * | 7/2006 | Gerasimov | G05D 16/107 137/505.18 |
| 7,373,915 B1 | 5/2008 | Joniec | |
| 7,665,714 B2 | 2/2010 | Stumbo | |
| 8,474,256 B2 | 7/2013 | Kamen | |
| 8,613,198 B2 | 12/2013 | Swinford | |
| 8,763,391 B2 | 7/2014 | Kamen | |
| 8,881,762 B2 | 11/2014 | Johnson | |
| 9,249,892 B2 | 2/2016 | Klippert | |
| 9,435,455 B2 | 9/2016 | Peret | |
| 9,476,282 B2 | 10/2016 | Anton | |
| 2003/0121548 A1 * | 7/2003 | Giordano | F16K 17/30 137/505 |
| 2007/0295409 A1 * | 12/2007 | Diesing | F16K 17/04 137/505 |
| 2008/0302538 A1 | 12/2008 | Hofman | |
| 2011/0146601 A1 | 6/2011 | Fisher | |
| 2012/0111574 A1 | 5/2012 | Desranleau | |
| 2016/0003005 A1 | 1/2016 | Pickle | |
| 2016/0061370 A1 | 3/2016 | Gennasio | |
| 2016/0084434 A1 | 3/2016 | Janway | |

* cited by examiner

PRESSURE RELIEF VALVE

FIELD OF THE INVENTION

The present invention relates generally to valves, and more particularly to dump valves, pressure relief valves and other types of valves

BACKGROUND OF THE INVENTION

At their most basic, a valve controls the flow of a fluid or gas. Valves are integral components in almost every gas or fluid system. A pressure relief valve is a type of valve used to control or limit the pressure in a system. The pressure is relieved by allowing the pressurized fluid to flow through the valve and out of the system. Often, this type of valve is designed to open at a predetermined pressure to protect equipment from being subjected to pressures that exceed their design limits. When the set pressure is exceeded, the relief valve becomes the "path of least resistance" as the valve is forced open and the fluid or gas is allowed to escape. As the fluid or gas escapes, the pressure in the system decreases. Once it reaches the valve's reseating pressure, the valve will close.

However, in most systems that use moving parts, there are problems specific to the part. Common valve problems include noise, vibration, reverse flow sticking, leakage, component wear, or damage. In addition, valves are subject to wear—whenever one part rubs against another part, wear is a result, which leads to leakage and eventual failure of one or more components. A component failure can result in the valve not performing its function, which in the case of a pressure relief valve, preventing system overpressure.

Therefore, there remains a need to overcome one or more of the limitations in the above-described, existing art. The discussion of the background to the invention included herein is included to explain the context of the invention. This is not to be taken as an admission that any of the material referred to was published, known or part of the common general knowledge as at the priority date of the claims.

It will be recognized that some or all of the Figures are schematic representations for purposes of illustration and do not necessarily depict the actual relative sizes or locations of the elements shown. The Figures are provided for the purpose of illustrating one or more embodiments of the invention with the explicit understanding that they will not be used to limit the scope or the meaning of the claims.

DETAILED DESCRIPTION OF THE PREFERRED EMBODIMENTS

In the following description, for the purposes of explanation, numerous specific details are set forth in order to provide a thorough understanding of the pressure relief valve apparatus and system ("PRV") that embodies principals of the present invention. It will be apparent, however, to one skilled in the art that the pressure relief valve apparatus and system may be practiced without some of these specific details. Throughout this description, the embodiments and examples shown should be considered as exemplars, rather than as limitations on the pressure relief valve apparatus and system. That is, the following description provides examples, and the accompanying drawings show various examples for the purposes of illustration. However, these examples should not be construed in a limiting sense as they are merely intended to provide examples of the pressure relief valve apparatus and system rather than to provide an exhaustive list of all possible implementations of the pressure valve apparatus and system.

Specific embodiments of the pressure valve apparatus and system invention will now be further described by the following, non-limiting examples which will serve to illustrate various features. The examples are intended merely to facilitate an understanding of ways in which the invention may be practiced and to further enable those of skill in the art to practice the invention. Accordingly, the examples should not be construed as limiting the scope of the invention. In addition, reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

The present invention comprises a pressure relief valve ("PRV"), and in one embodiment comprises an intake manifold vacuum-actuated valve designed to release pressure in the intake system of a supercharged or turbocharged engine when the throttle is lifted or closed. Generally, in an internal-combustion engine, air is compressed by a supercharger or turbocharger, (hereinafter generically referred to as "compressor"), and then routed to an intake manifold on the engine. Between the compressor and the intake manifold is a throttle body that controls the amount of compressed air going from the compressor to the intake manifold. When the throttle body is closed, usually by a butterfly valve, the compressed air is trapped and a pressure wave is forced back toward the compressor (i.e., "compressor surge"). This adds stress on the bearings and shaft of the compressor, which can potentially break components in the compressor.

The pressure relief valve (PRV) of the present invention is used to prevent compressor surge by providing pressure relief. The PRV is located between the compressor and the throttle body. In one embodiment, the PRV is connected by a vacuum hose to the intake manifold. When the throttle body is closed, the relative intake manifold pressure drops, sometimes below atmospheric pressure, and the resulting pressure drop, or vacuum, operates the PRV, which opens and allows air trapped between the compressor and throttle body to escape to the atmosphere, thereby preventing compressor surge. Alternatively, the air can be recirculated into the engine's air intake upstream of the compressor inlet.

It will be appreciated that the PRV of the present invention may have applications other than internal-combustion engines. Also, as defined herein, "fluid" refers to fluid in the form of a gas, such as air from the atmosphere, or isolated gasses, such as hydrogen, helium, carbon dioxide or other gasses. The PRV may be employed in any fluid system.

Figure 1:
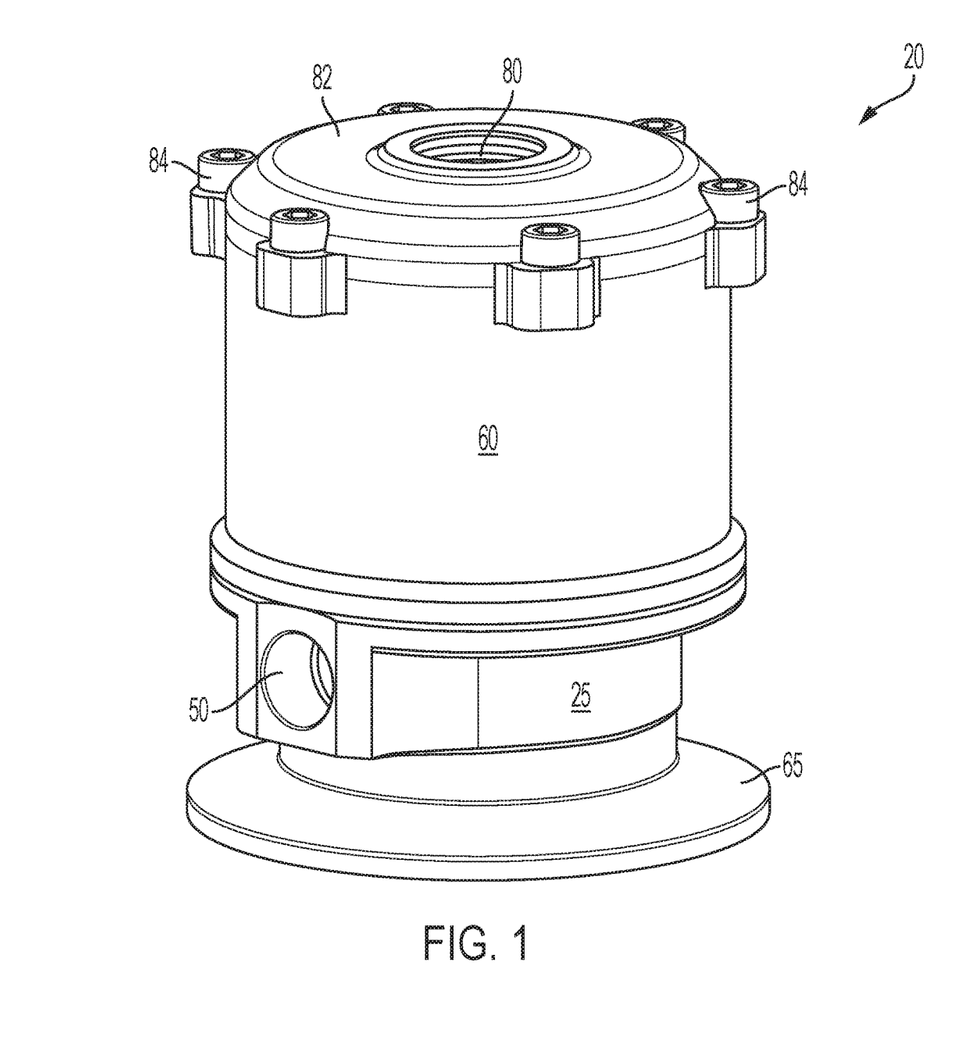
FIG. 1 is a perspective view of one embodiment of a pressure relief valve embodying the principals of the invention, with the valve in the closed position.
Figure 2:
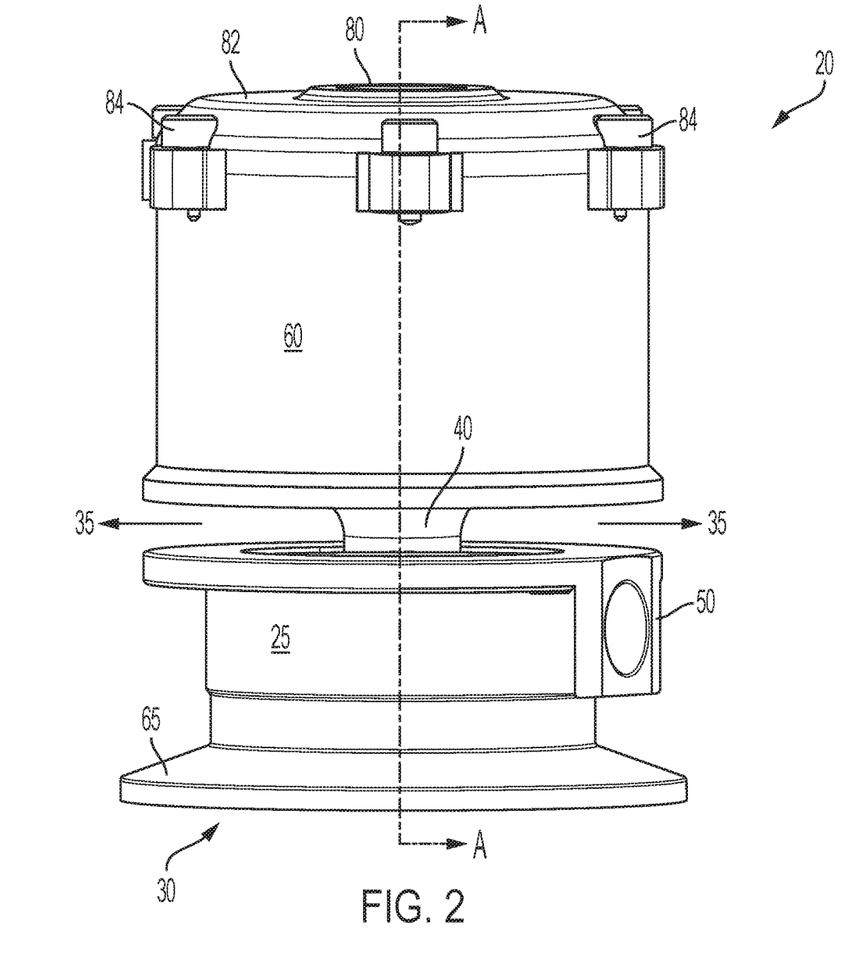
FIG. 2 is an elevation view of the pressure relief valve illustrated in FIG. 1, with the valve in the open position.
Figure 3:
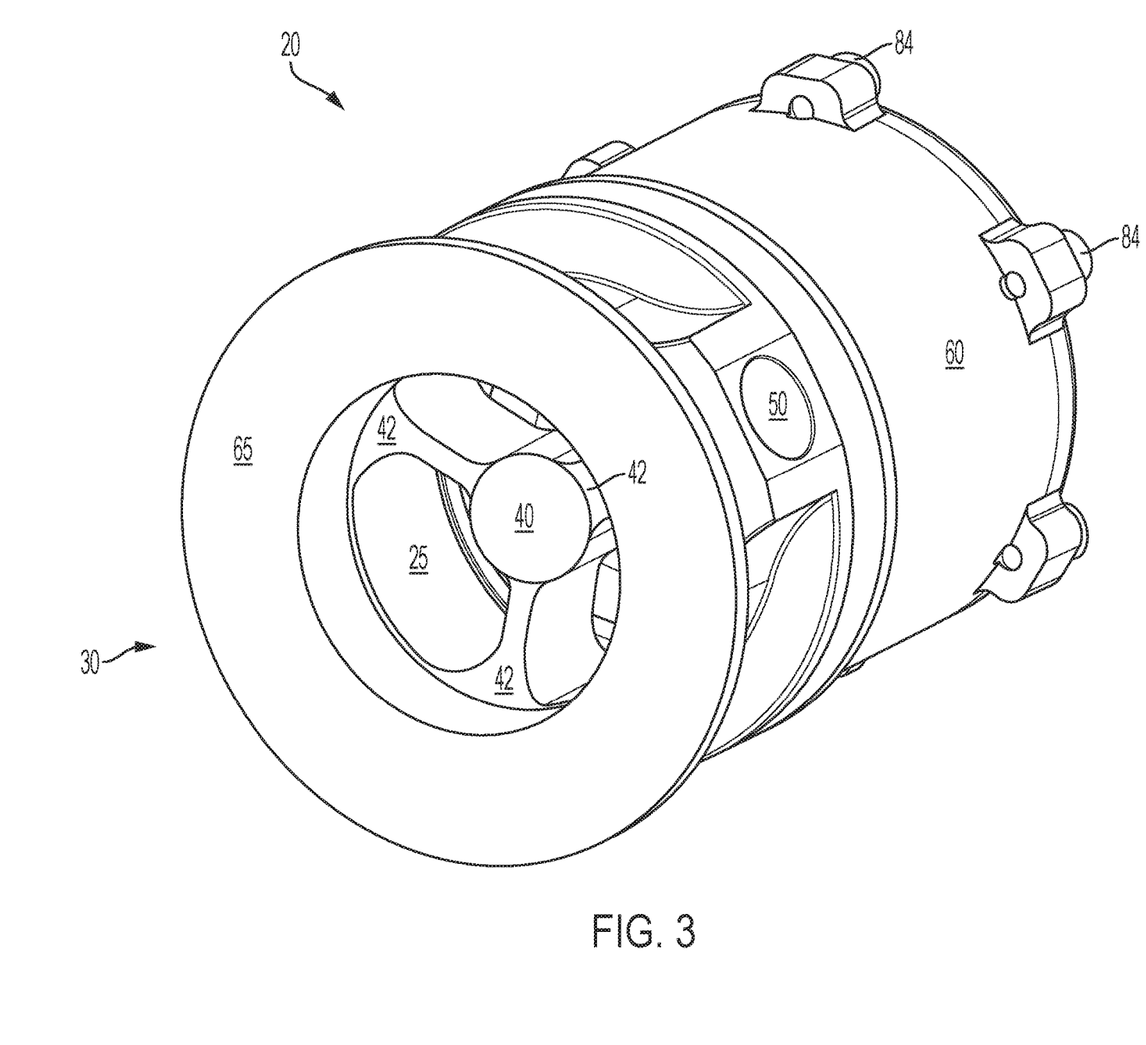
FIG. 3 is a bottom perspective view of the embodiment of FIG. 1, with the valve in the closed position.
Figure 4:
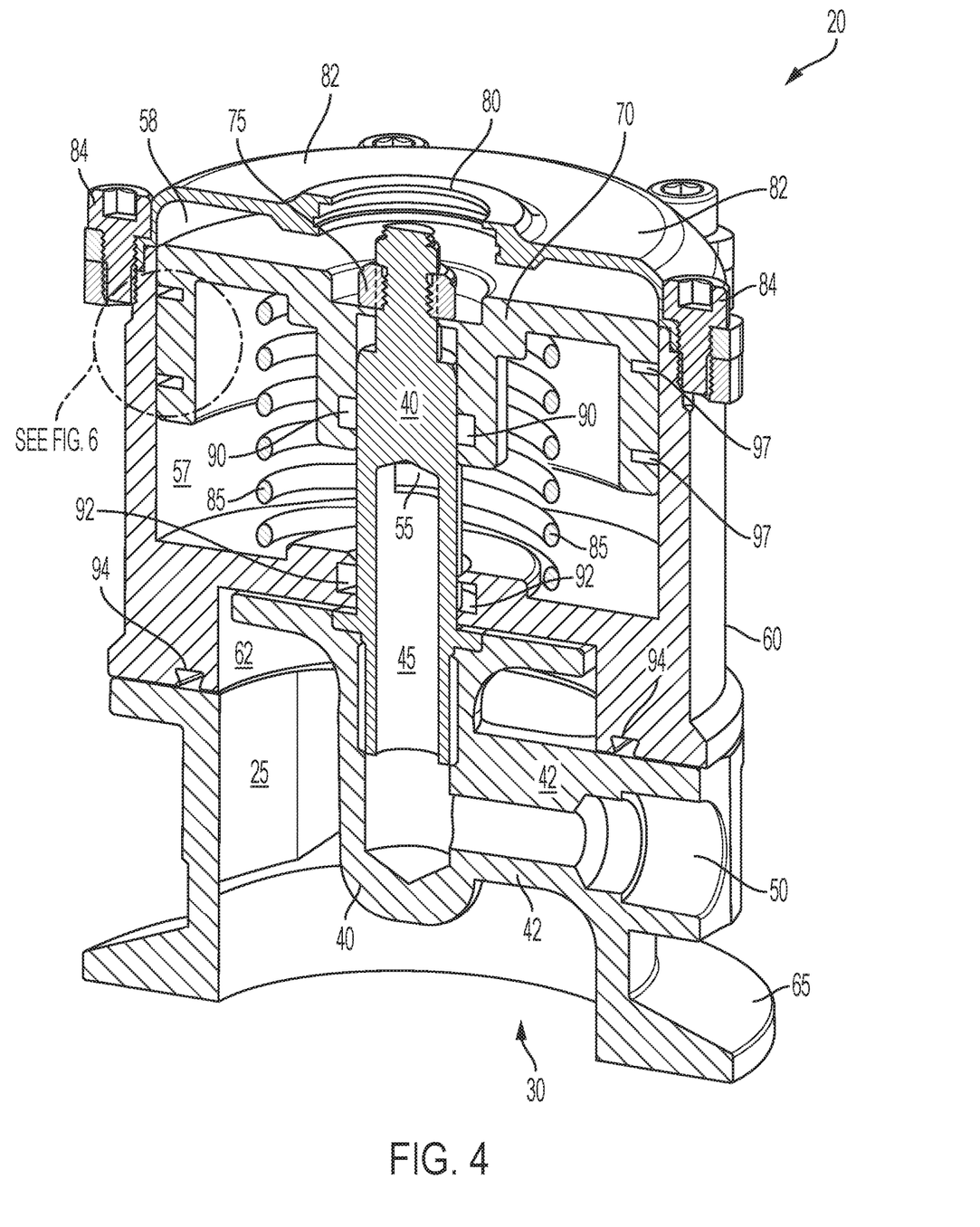
FIG. 4 is a sectional view taken along cutting plane A--A of FIG. 2, with the valve in the closed position.
Figure 5:
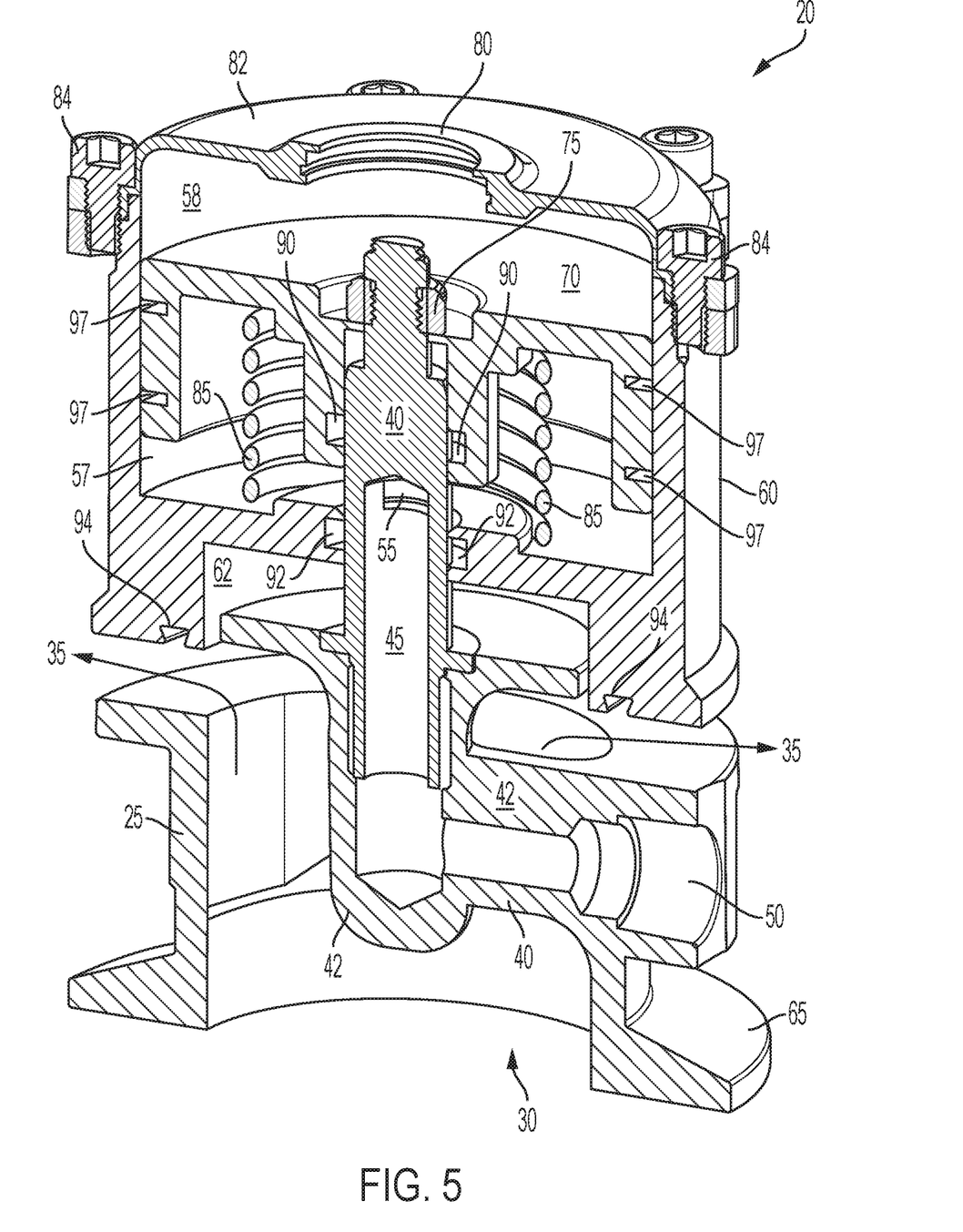
FIG. 5 is a sectional view taken along cutting plane A--A of FIG. 2, with the valve in the open position.

Referring now to FIGS. 1-6, a pressure relief valve apparatus (PRV) or system 20 is illustrated. The PRV 20 includes a base member 25 having an inlet 30 and an outlet 35. The inlet 30 and outlet 35 comprise a primary aperture, or opening that allows a fluid, such as air to flow through the base member 25 when the PRV 20 is in the open position, as shown in FIGS. 2 and 5.

As shown in FIGS. 4-5, a support element, or guidepost 40 extends from the base member 25 and includes a hollow section 45, which may be tube-shaped that communicates with a secondary aperture, or opening 50 located in a side of the base member 25. FIG. 3 shows three legs 42 extending from the interior of the base member 25 to the guidepost 40. The legs 42 fix the guidepost 40 to the base member 25, and one of the legs 42 includes the opening 50 that communicates with the hollow section 45 of the guidepost 40. In one embodiment, the opening 50 is sized to connect to a vacuum hose that is connected to an intake manifold of an internal combustion engine (not shown). In other embodiments, the opening 50 can be connected to any fluid source that can be used to open and close the PRV 20, as discussed herein.

Again referring to FIGS. 4-5, the support element or guidepost 40 also includes a guidepost opening, or duct 55 located at an end of the hollow section 45. A fluid, such as air, is able to pass from the secondary aperture 50 in the base member 25 and continue through the hollow section 45 and then exit the duct 55 into a lower interior chamber 57 of a moveable housing 60.

As shown in FIGS. 1-5, in one embodiment the moveable housing 60 is cylindrical, but it will be appreciated that it may have other shapes. Similarly, the base member 25 is shown as cylindrical but it will be appreciated that an oval, elliptical or other shape may be employed. For example, the base flange 65 may have a curved bottom to attach to a cylindrical pipe, or it may be flat, as illustrated. In one embodiment, the base flange 65 is sized to enable coupling to pipes, or tubes of an internal-combustion engine.

As shown in FIGS. 1-4, the moveable housing 60 includes a moveable housing base 62 that abuts the base member 25 and also has an interior chamber located above the base 62 that is enclosed by a removeable housing cover 82 that is attached to the moveable housing 60 by fasteners 84. Located within the interior chamber is a housing guide 70 that locates the moveable housing 60 relative to the base member 25 as the moveable housing 60 extends away from, and retracts toward the base member 25 during operation (discussed below). The housing guide 70 divides the interior chamber into an upper interior chamber 58, formed by the interior surface of the housing cover 82 and the top of the housing guide 70, and a lower interior chamber 58 that comprises an upper interior surface of the moveable housing base 62 and a bottom interior surface of housing guide 70.

Referring now to FIGS. 4-5, the moveable housing 60 is slideably coupled to a housing guide 70. The housing guide 70 is adjustably attached to the guidepost 40. For example, a distal end of the guidepost 40 includes fastener threads onto which is threaded an adjustment nut, or fastener 75. The fastener 75 is accessed through a housing cover aperture 80. As discussed in further detail below, as the adjustment fastener 75 is threaded further onto the guidepost 40, a spring 85 is compressed. Also, the housing guide 70 includes an upper O-ring gland, or slot 90 and accompanying structure that forms a cylinder that surrounds the guidepost 40. The O-ring (not shown) prevents air, or another fluid, from escaping the lower interior chamber 57 into the upper interior chamber 58.

A lower O-ring gland, or slot 92 is included in the moveable housing 60 and the O-ring (not shown) performs the same function of preventing air escaping from the lower interior chamber 57. Another, or third O-ring gland, or slot 94 is included in the moveable housing base 62 and the O-ring (not shown) provides a seal for the moveable housing 60 when it contacts the base member 25. This third O-ring also prevents fluid from escaping from the fluid outlet 35 when the PRV 20 is in the closed position, as shown in FIG. 4. All of the O-rings used in the PRV 20 are the conventional type, that is, each O-ring (not shown) located in each gland or slot 90, 92 and 94 comprises a gasket in the form of a ring having a generally circular cross-section, and each is made of a pliable material and each is employed to provide a seal.

As shown in FIGS. 1-2 and 4-5, a housing cover 82 is attached to the moveable housing 60 by fasteners 84. The housing cover aperture 80 is located in the housing cover 82 and a sintered metal filter, or other type of fluid filter (not shown) may be removably located in the housing cover aperture 80. The housing cover aperture 80 allows the upper interior chamber 58 to remain at approximately ambient pressure regardless of the movement of the moveable chamber 60.

Figure 6:
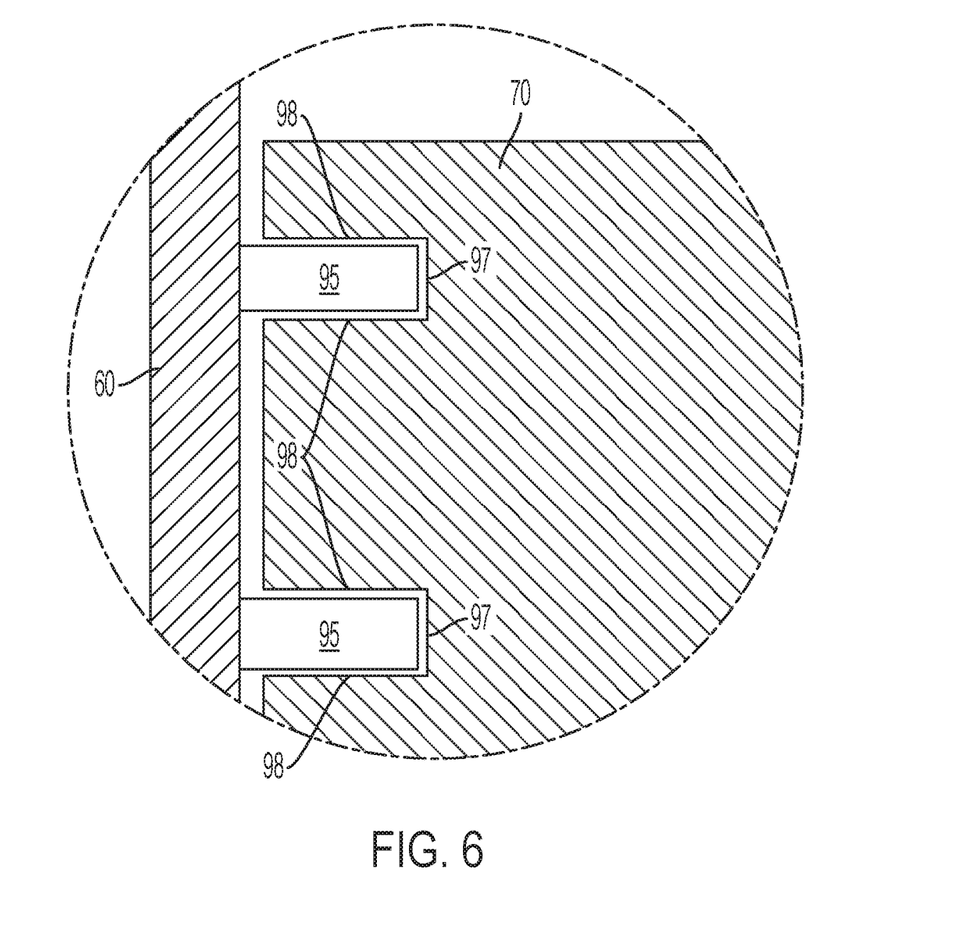
FIG. 6 is a close-up view taken from FIG. 4, showing the two split rings that are included in the embodiment of FIG. 1.

Referring now to FIGS. 4-6, two split rings 95 are moveably located in two ring grooves 97. FIG. 6 shows the two split rings 95 installed in the ring grooves 97. FIGS. 4-5 show the ring grooves 97, without the split rings 95. The ring grooves 97 comprise a recessed area located around a perimeter of the housing guide 70 and are sized to retain the split rings 95. The ring groves 97 each include ring lands 98 that comprise two parallel surfaces of the ring groove 97 which function as a sealing surface for a respective split ring 95. In one embodiment of the PRV 20, each split ring 95 comprises an expandable split ring used to provide a seal between the housing guide 70 and the moveable housing 60. The split rings 95 are similar to conventional internal combustion piston rings in that they comprise a circular ring that is split to facilitate installation.

In a preferred embodiment, each split ring 95 is made of a polytetrafluoroethylene (PTFE), which is a synthetic fluoropolymer of tetrafluoroethylene. The well-known brand name of several PTFE-based formulas is TEFLON (TEFLON is a registered trademark of E.I. du Pont de Nemours and Company of Wilmington, Del.). It will be appreciated that the split rings 95 used in the PRV 20 may be manufactured from other materials. One type of split ring 95 that may be employed by the PRV 20 includes a split ring manufactured by Hercules Sealings Products of Canada (part 575-224ST PTFE back-up ring). It will be appreciated that the PRV 20 may employ only one split ring 95 or the PRV 20 may use three split rings 95.

As employed in the PRV 20, the split rings 95 seal the lower interior chamber 57, preventing any fluid leakage during operation of the PRV 20. The upper interior chamber 58 remains at approximately ambient air pressure. As mentioned above, the PRV 20 is a pressure relief, or dump valve. Generally, a conventional dump valve employs a poppet valve having a spring to keep it closed and a diaphragm actuator to open the valve during engine decelerations when the engine's intake manifold provides a vacuum. However, air is trapped between the lower side of the diaphragm and the housing with the valve guide. That pressure must be vented, usually through restrictive ports, to allow movement of the diaphragm. This venting process slows the valve action. One feature of the PRV 20 is the latent pressure that slows the operation of conventional dump valves is non-existent.

As installed on an internal combustion engine having supplemental atmospheric boost pressure provided by a supercharger or turbocharger (hereinafter generically referred to as a "compressor"), the PRV 20 base flange 65 is attached to a duct to be vented. The attachment can be by various means, including a v-band, or other means. A portion of the fluid, such as air passing through the duct moves into the fluid inlet 30, where it may be vented through the fluid outlet 35 or sealed, depending on the operational mode of the PRV 20. Unlike the conventional valves, the control pressure inlet, in the form of the secondary aperture 50, is on the side of the base member 25, just above the base flange 65.

During idle of the internal combustion engine having a compressor, fluid pressure at the secondary aperture 50 is at moderate vacuum and fluid pressure at the fluid inlet 30 is at a moderately higher pressure than ambient. In this condition, the PRV 20 may be partially open, depending on spring adjustment. That is, the moveable housing 60 may be partially open, as shown in FIGS. 2 and 5, so that fluid can pass through the fluid inlet 30 and escape out through fluid outlet 35. The amount of opening of the PRV 20 is mainly controlled by the spring 85. As mentioned above, the adjustment fastener 75 is accessed through the housing cover aperture 80 and as the adjustment fastener 75 is rotated a pre-load on the spring 85 is changed. Changing the spring 85 pre-load will change when the PRV 20 is actuated, or opened. The condition where the PRV 20 may be partially open is also possible when the engine is operating at cruise, or in a partial-throttle setting. Again, this is variable, depending on the pre-load on the spring 85.

In the case when the compressor is operating, and providing boosted, or higher-than atmospheric air to the internal combustion engine, the fluid pressure at the secondary aperture 50 and at the fluid inlet 30 are approximately equal, so the PRV 20 is closed, as shown in FIGS. 1 and 3-4.

Finally, when the engine's throttle is lifted or closed, vacuum will enter chamber 57 and the PRV 20 will open. For example, as discussed above, between the compressor and the intake manifold is a throttle body that usually comprises a butterfly valve. When the throttle is "closed" the butterfly valve blocks air from flowing to the engine's intake manifold, and the compressed air is trapped and a pressure wave is forced back toward the compressor (i.e., "compressor surge"). This adds stress on the bearings and shaft of the compressor, which can potentially break components in the compressor. In this situation, with the PRV 20 located between the throttle body and the compressor, the fluid pressure at the secondary aperture 50 is a vacuum, as it is connected to the intake manifold, which is no longer receiving air from the compressor. However, the fluid pressure at the fluid inlet 30 of the PRV 20 will be very high, as it is receiving air that is trapped between the throttle body and compressor.

As shown in FIG. 5, in the situation described immediately above, the fluid pressure inside the lower interior chamber 57 will be a vacuum, as fluid may be removed from the lower interior chamber 57 through guidepost duct 55, down the hollow tube 45 and out secondary aperture 50 to the intake manifold. The high fluid pressure located at the fluid inlet 30 now pushes against the surfaces of the moveable housing base 62 that communicate with the fluid inlet 30, resulting in a high fluid pressure differential between the lower interior chamber 57 and the fluid inlet 30. The pressure differential pulls and pushes the moveable housing 60 away from the base member, thereby compressing the spring 85, and allowing the fluid to escape through the fluid outlet 35.

When the pre-load on the spring 85 is able to exceed the force the fluid pressure exerts against the moveable housing 60, the spring 85 pushes the moveable housing 60 toward the base member 25, so that the O-ring located in the base 62 of the moveable housing 60 contacts the base member 25 and stops fluid flow through the fluid outlet 35.

One feature of the PRV 20 is that it provides a relatively large area for fluid to escape. That is, when compared to similar sized conventional type valves, the total area (through fluid outlet 35) available for fluid escape is much greater than the area available when a poppet-type valve opens.

Another feature of the PRV 20 is that the split rings 95 that provide a seal between the lower interior chamber 57 and the upper interior chamber 58, which is at approximately ambient air pressure. Also, the split rings 95 generate very little friction resistance. That is, the moveable housing 60 can open and close, or move away from, and toward the base member 25 very quickly and easily so that the PRV 20 can operate to prevent fluid pressure from damaging the compressor.

In contrast to a piston ring in an internal combustion engine, where the surrounding cylinder is stationary, and the piston, and piston ring move within the cylinder, in the PRV 20, the split rings 95 and housing guide 70 are stationary. As the moveable housing 60 extends away from the base member 25, the split rings 95 mounted in the housing guide 70 move a small amount to lodge against the upper land 98 as the housing guide 70 remains stationary. Then, as the fluid escapes through outlet 35, and the fluid pressure drops, the moveable housing 60 retracts toward the base member 25, and the split rings 95 move a small amount to lodge against the lower land 98. Put differently, the action of the split rings 97, housing guide 70 and moveable housing 60, is opposite to that of the movement of a piston within a cylinder of an internal combustion engine. The split rings 95 may have a minimal amount of air flow through the gap, or split in each split ring 95 (the gap, or split in each split ring 95 is required to allow each split ring 95 to be expanded so that it can be installed in its respective ring groove 97). As the moveable housing 60 extends away from, and retracts toward the base member 25, ambient air enters, and exits, respectively, the upper interior chamber 58 through the housing cover aperture 80, which may include a sintered metal, or other type of filter (not shown).

It will be appreciated that the PRV 20 may be manufactured in many different sizes, to suit any application. For example, for smaller engines, a diameter of the fluid inlet may be 50 millimeters, but for larger engines the diameter of the fluid inlet may be 63 millimeters, or 76 millimeters or larger. In an application where the diameter where the fluid inlet 63 millimeters, the outer diameter of the housing guide may be two and one-half inches (2.5"). One feature of the PRV 20 is the location of the secondary aperture 50, because in a preferred embodiment, a vacuum tube may be coupled to the secondary aperture 50, and the vacuum tube can be routed adjacent to the duct that the PRV 20 is coupled to. This is in contrast to conventional poppet-style valves that have a vacuum tube connected at their distal end, which positions the vacuum tube perpendicular to the duct.

Thus, it is seen that a pressure relief valve apparatus, system and method is provided. One skilled in the art will appreciate that the present invention can be practiced by other than the above-described embodiments, which are presented in this description for purposes of illustration and not of limitation. The specification and drawings are not intended to limit the exclusionary scope of this patent document. It is noted that various equivalents for the particular embodiments discussed in this description may practice the invention as well. That is, while the present invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims. The fact that a product, process or method exhibits differences from one or more of the above-described exemplary embodiments does not mean that the product or process is outside the scope (literal scope and/or other legally-recognized scope) of the following claims.

It is to be noticed that the term "comprising", used in the claims, should not be interpreted as being limitative to the means listed thereafter. Thus, the scope of the expression "a device comprising means A and B" should not be limited to devices consisting only of components A and B. It means that with respect to the present invention, the only relevant components of the device are A and B. Similarly, it is to be noticed that the term "coupled", also used in the claims, should not be interpreted as being limitative to direct connections only. Thus, the scope of the expression "a device A coupled to a device B" should not be limited to devices or systems wherein an output of device A is directly connected to an input of device B. It means that there exists a path between an output of A and an input of B which may be a path including other devices or means. Also, "coupled" may mean attached in a fixed manner, or attached so that relative movement between one or elements is possible. Finally, the terms "a", "an" and "the" mean "one or more", unless expressly specified otherwise.

What is claimed is:

1. A valve apparatus, comprising:
   a base member having a support element extending therefrom;
   a moveable housing slideably coupled to the support element, so that the moveable housing moves toward and away from the base member;
   a housing guide located within the moveable housing, the housing guide adjustably coupled to the support element, and slideably coupled to the moveable housing; where the base member does not enclose the moveable housing.

2. The valve apparatus of claim 1, further comprising a split ring moveably coupled to the housing guide, the split ring abutting the moveable housing.

3. The valve apparatus of claim 1, where the base member includes a primary aperture extending therethrough, and a secondary aperture communicating with the support element.

4. The valve apparatus of claim 1, further comprising a coil spring located between the moveable housing and the housing guide.

5. The valve apparatus of claim 1, where the support member comprises:
   a first end comprising a hollow tube having an opening communicating with an aperture located in the base member;
   a second end adjustably mounted to the housing guide; and
   an aperture located at a distal end of the hollow tube, the aperture communicating with the moveable housing.

6. The valve apparatus of claim 1, where the base member includes a flange structured to removably couple to a fluid source.

7. The valve apparatus of claim 1, where the base member includes an aperture communicating with an air source that is selectively less than, or greater than, an ambient air pressure.

8. A valve apparatus, comprising:
   a cylindrical base member having a support element extending therefrom;
   a cylindrical moveable housing slideably coupled to a support element, so that the cylindrical moveable housing selectively extends from and retracts toward the base member;
   a cylindrical housing guide located within the cylindrical moveable housing, the cylindrical housing guide adjustably coupled to the support element, and slideably coupled to the moveable housing; where the cylindrical base member does not enclose the cylindrical moveable housing.

9. The valve apparatus of claim 8, further comprising at least one split ring moveably coupled to the cylindrical housing guide, with the split ring abutting the moveable housing.

10. The valve apparatus of claim 8, where the cylindrical base member further comprises:
    a flange for coupling the valve apparatus to an air source;
    a primary aperture extending through the flange and the cylindrical base member; and
    a secondary aperture communicating with the support element.

11. The valve apparatus of claim 8, further comprising a coil spring located between the cylindrical moveable housing and the cylindrical housing guide.

12. The valve apparatus of claim 8, where the cylindrical support member comprises:
    a first end comprising a hollow tube having an opening communicating with an aperture located in the base member;
    a second end adjustably mounted to the cylindrical housing guide; and
    an aperture located at a distal end of the hollow tube, the aperture communicating with the cylindrical moveable housing.

13. The valve apparatus of claim 8, where the cylindrical base member includes an aperture communicating with an air source that is less than an ambient air pressure.

14. A method of changing a pressure in a pressurized system, the method comprising the steps of:
    providing a hollow body having an inlet and an outlet, and an aperture extending through the hollow body;
    providing an actuator assembly coupled to the hollow body, the actuator assembly comprising:
    a moveable housing slideably coupled to the hollow body so that the moveable housing moves toward and away from the hollow body; and
    a housing guide located within the moveable housing, the housing guide adjustably coupled to the support element, and slideably coupled to the moveable housing; where the hollow body does not encloses the moveable housing.

15. The method of claim 14, further comprising the step of:
    selectively providing either a lower than ambient air pressure, or a greater than ambient air pressure to the hollow body through the aperture, which causes the actuator assembly to respectively move away from, or toward, the hollow body, and respectively un-covering the outlet, or covering the outlet, thereby changing a pressure in the pressurized system.

16. The method of claim 14, where the support element comprises:
    a first end comprising a hollow tube having an opening communicating with the aperture located in the hollow body;
    a second end adjustably mounted to the housing guide; and
    an aperture located at a distal end of the hollow tube, the aperture communicating with the moveable housing.

\* \* \* \* \*